Oct. 17, 1967

W. E. THIEL 3,347,458

TRIGONOMETRICAL COMPUTER

Filed March 29, 1966

INVENTOR
Walter E. Thiel
BY Polachek & Saulsbury
ATTORNEYS

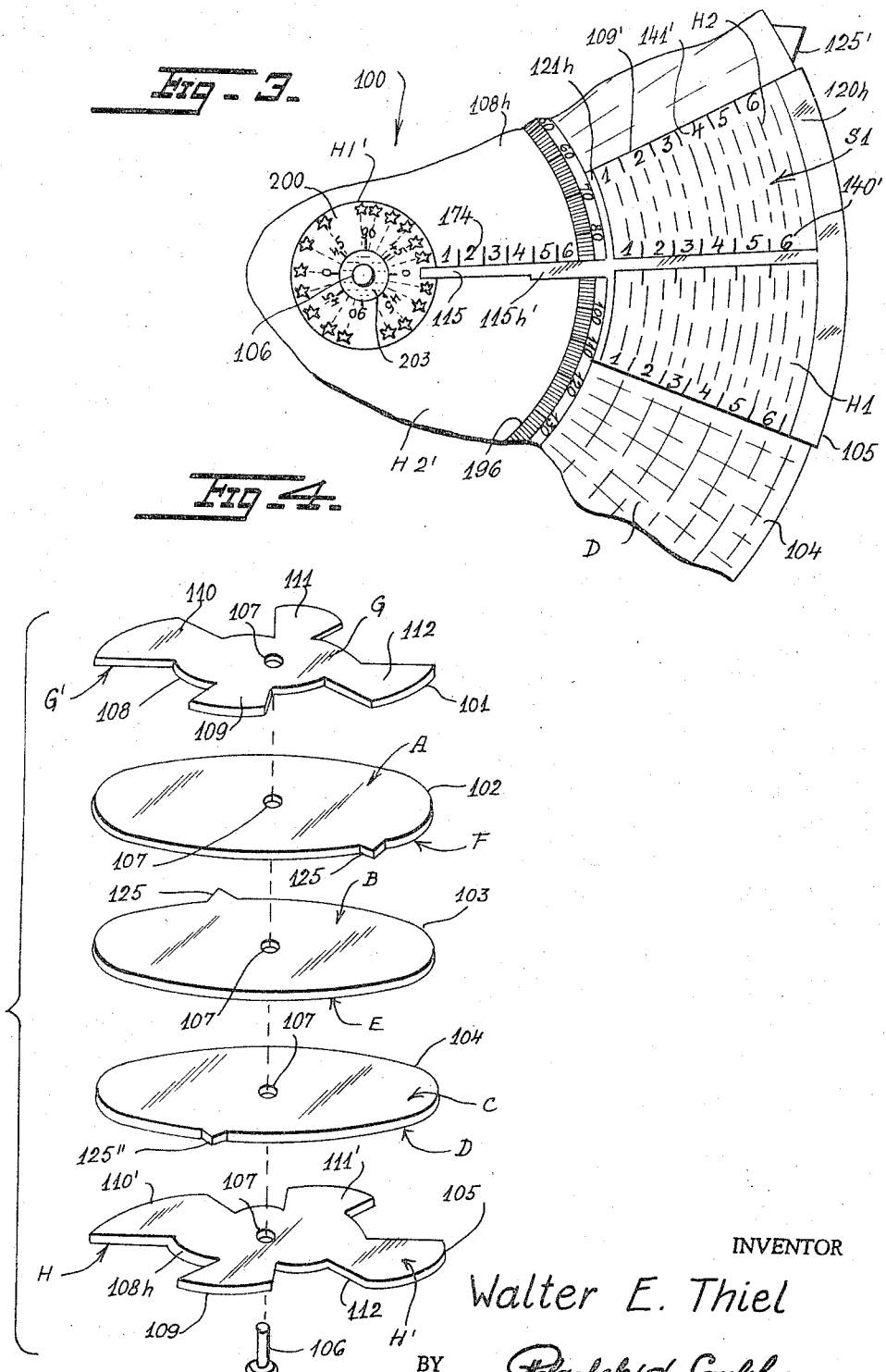

Oct. 17, 1967  W. E. THIEL  3,347,458
TRIGONOMETRICAL COMPUTER
Filed March 29, 1966  7 Sheets-Sheet 3
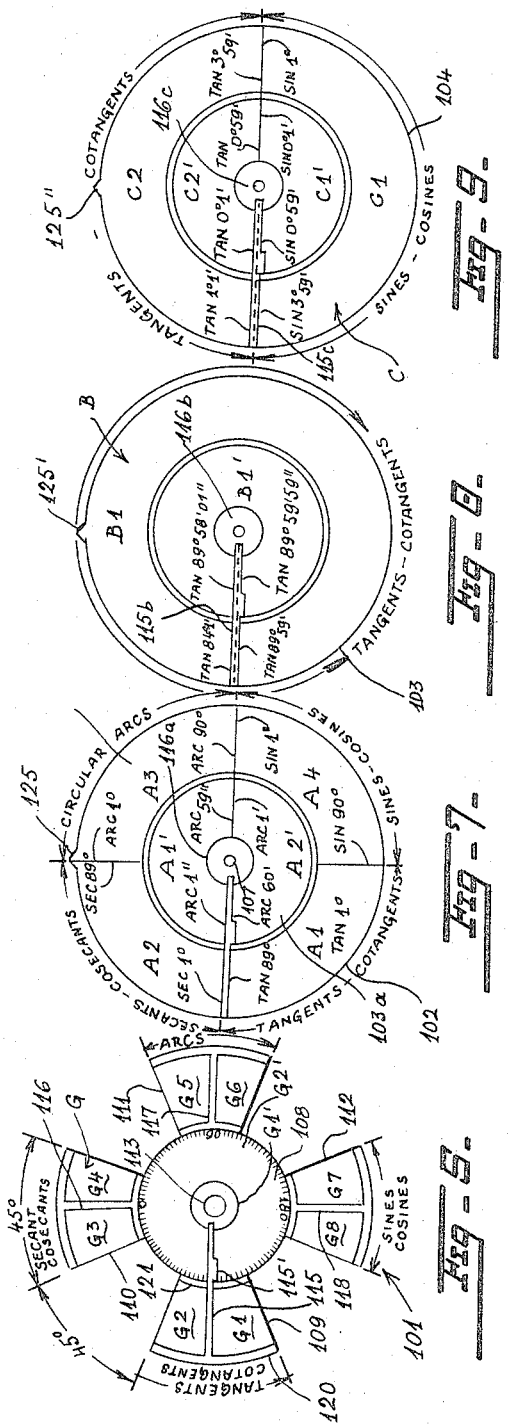
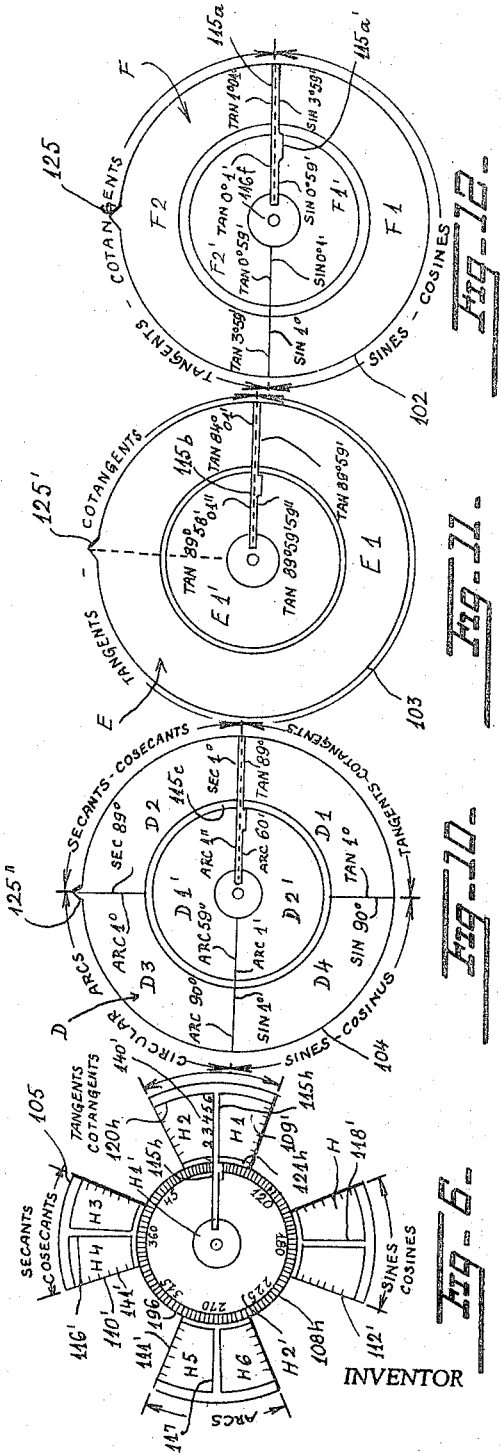
INVENTOR
Walter E. Thiel
BY
Polachek & Saulsbury
ATTORNEYS

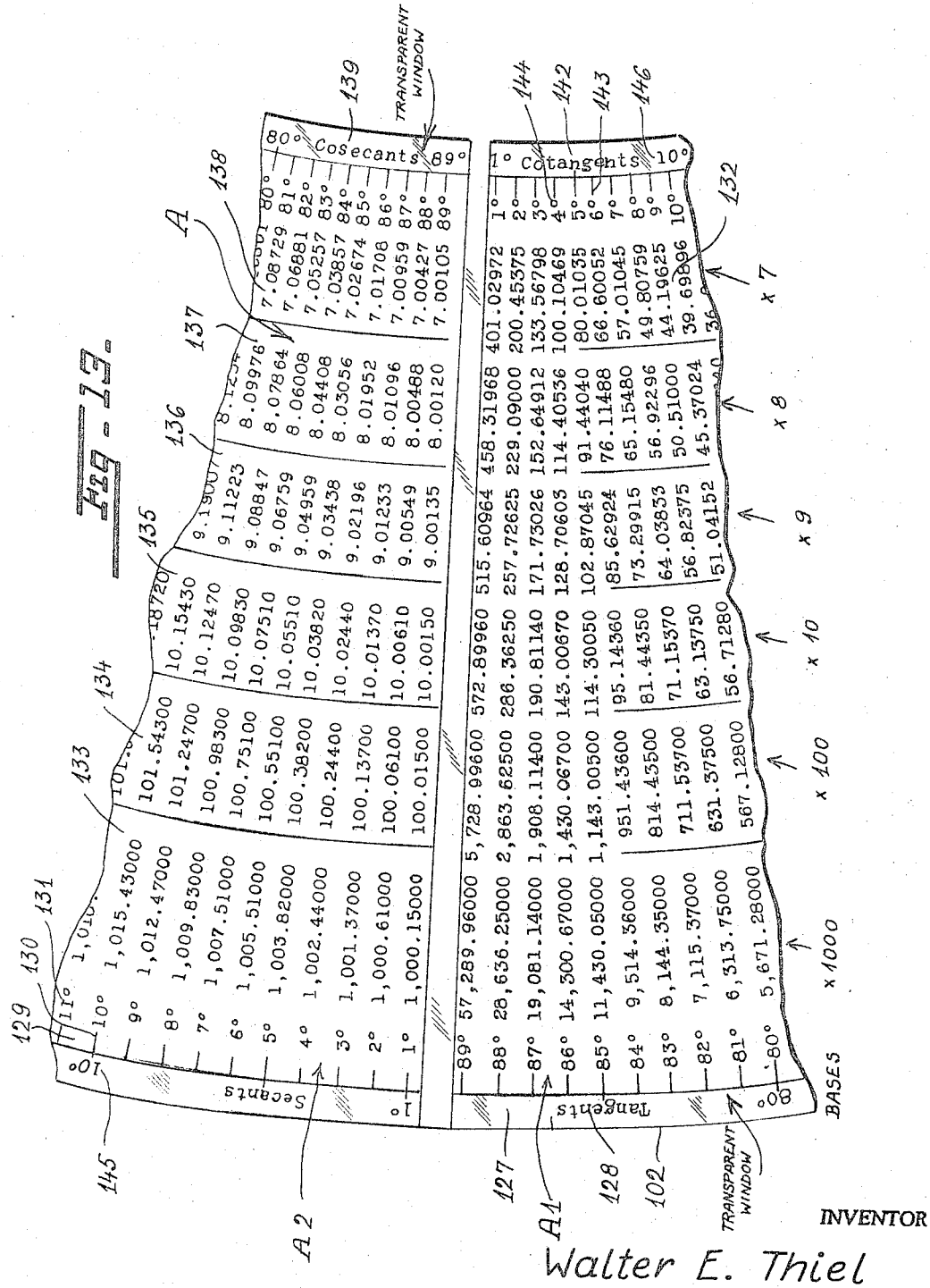

Oct. 17, 1967  W. E. THIEL  3,347,458
TRIGONOMETRICAL COMPUTER
Filed March 29, 1966  7 Sheets-Sheet 5

Fig-14

| | ×100 | ×1000 | ×9 | ×8 | ×7 | | |
|---|---|---|---|---|---|---|---|
| CIR.ARC 4" | 0.0019400 | 0.0001940 | 0.0001746 | 0.0001552 | 0.0001358 | CIR.ARC 5" | |
| CIR.ARC 3" | 0.0014500 | 0.0145000 | 0.0001305 | 0.0001160 | 0.0001015 | CIR.ARC 4" | |
| CIR.ARC 2" | 0.0009700 | 0.0000970 | 0.0000873 | 0.0000776 | 0.0000679 | CIR.ARC 3" | |
| CIR.ARC 1" | 0.0004800 | 0.0097000 | 0.0000432 | 0.0000384 | 0.0000336 | CIR.ARC 2" | |
| | 0.0000480 | 0.0048000 | | | | CIR.ARC 1" | |

| CIR.ARC 60' | 0.1745330 | 0.1570797 | 0.1396264 | 0.1221731 | CI.ARC 60' |
|---|---|---|---|---|---|
| | 1.7453300 | 17.453300 | | | |

Fig-27

INVENTOR
*Walter E. Thiel*
BY
*Polachek & Saulsbury*
ATTORNEYS

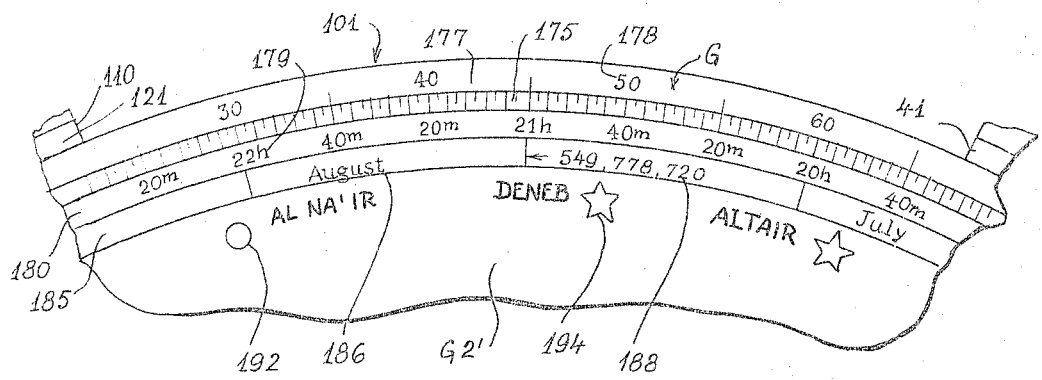
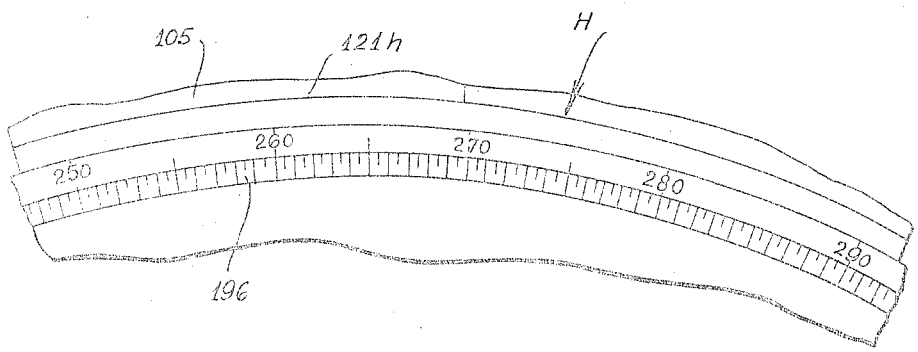

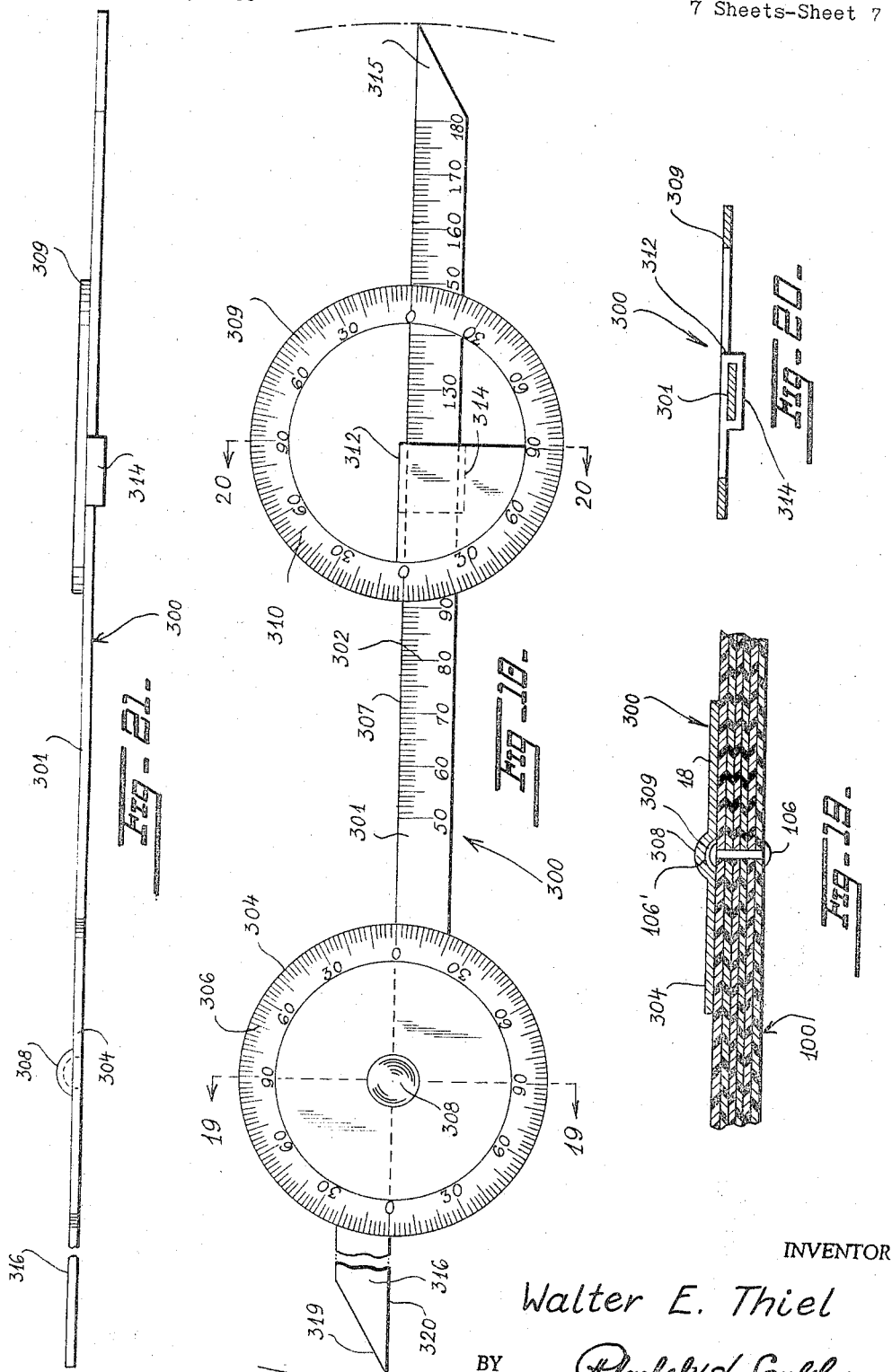

United States Patent Office 3,347,458
Patented Oct. 17, 1967

3,347,458
TRIGONOMETRICAL COMPUTER
Walter E. Thiel, 3200 Netherland Ave.,
New York, N.Y. 10463
Filed Mar. 29, 1966, Ser. No. 538,343
8 Claims. (Cl. 235—88)

ABSTRACT OF THE DISCLOSURE

The disclosure describes a device for solving triangles and circular arc lengths. It also solves space and terresterial range problems for angular separations to apex or target from fractions of seconds, minutes, and full degrees by directing reading of ranges. The device can be used in terrestrial and space navigation using sun, heliocentric stars and planets as coordinates. It can also be used to determine positions of spacecraft in space, years in advance when heliocentric with certain stars using tabulated precession or change of right ascension of stars since Epoch 1964. It can also be used in surveying and allied fields of engineering. It employs a plurality of circular disks with radial and circumferential windows through which data can be read on underlying disks. Data on opaque sections of the disks between windows are visible through the transparent windows.

This invention is a continuation-in-part of my application—Ser. No. 418,401, now abandoned, filed Dec. 15, 1964.

This invention relates to a trigonometrical computer and more particularly concerns a computing device useful in solving problems involving triangles, arcs, and linear dimensions encountered in space navigation, range finding, astronomy, surveying and allied fields of engineering and applied science.

According to the invention there is provided a portable, compact device in the form of a laminated assembly of coaxial disks secured together at their centers and rotatable independently of each other. Outer ones of the disks have circumferential and radial windows. The radial windows which can be registered with corresponding radial windows in the inner disks. Trigonometric tables of functions and their cofunctions appear on the inner disks. Decimal numbers having eight significant figures are arranged radially of the inner disks so that they can be read through the radial windows of outer disks. The tables are also arranged in a multiplicity of tracks extending circumferentially of the inner disks. The numbers in each track being calculated to a different base number or multiplier for each function marked on the outer disks. The circumferential tracks are arranged in two annular groups on each side of the inner disks. Circumferential scales on the inner disks are visible through the circumferential windows of the outer disks. The outer disks have circularly arranged star charts, azimuth scales, sidereal time scales and other data useful in determining celestial ranges and longitudes. A supplementary space longitude and planet finder for use with the computer in overlaying relationship may also be provided.

It is therefore a principal object of the invention to provide a multi-purpose trigonometrical computer for solving easily, accurately and rapidly diverse trigonometrical problems.

A further object is to provide a computer device comprising a plurality of thin plastic disks rotatably secured together at their centers and each provided with a radial window for exposing radially arranged numbers on trigonometric tables inscribed on the inner disks.

Still another object is to provide a computer as described, wherein one of the outer disks is inscribed with a heliocentric true space compass rose, and sun, stars and vernal equinox used as coordinating reference points to determine space longitudes accurately.

Another object is to provide a computer as described which can be used to determine distance between sun, moon, planets, stars and other objects in space.

A further object is to provide a computer device as described with trigonometric tables of sines, cosines, secants, cosecants, tangents, cotangents and of lengths of circular arcs, accurately calculated to eight significant figures.

Another object is to provide a computer device as described with an associated device for determining space longitudes and planet locations in space.

Still another object is to provide a computer device as described which is relatively small and compact in form, which can be manufactured at relatively low cost, which is easy to use, accurate, and reliable.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 3 is a plan view of part of the device taken on the other side opposite from that of FIG. 1.

FIG. 4 is a reduced exploded perspective view of unassembled parts of the device.

FIG. 5 to 12 are reduced plan views partially diagrammatic in form showing the general arrangement of disks used in the computer device.

FIG. 13 and FIG. 14 are enlarged views of parts of the disk shown in FIG. 7.

FIG. 15 is an enlarged view of part of one outer disk shown in FIGS. 1 and 5.

FIG. 16 and FIG. 17 are enlarged views of parts of the other outer disk shown in FIGS. 3 and 6.

FIG. 18 is a plan view of a radius vector and oblique angle device employed in association with the computer device.

FIGS. 19 and 20 are cross sectional views taken on lines 19—19 and 20—20 respectively of FIG. 18.

FIG. 21 is an edgewise elevational view of the device of FIG. 18.

Figure 1:
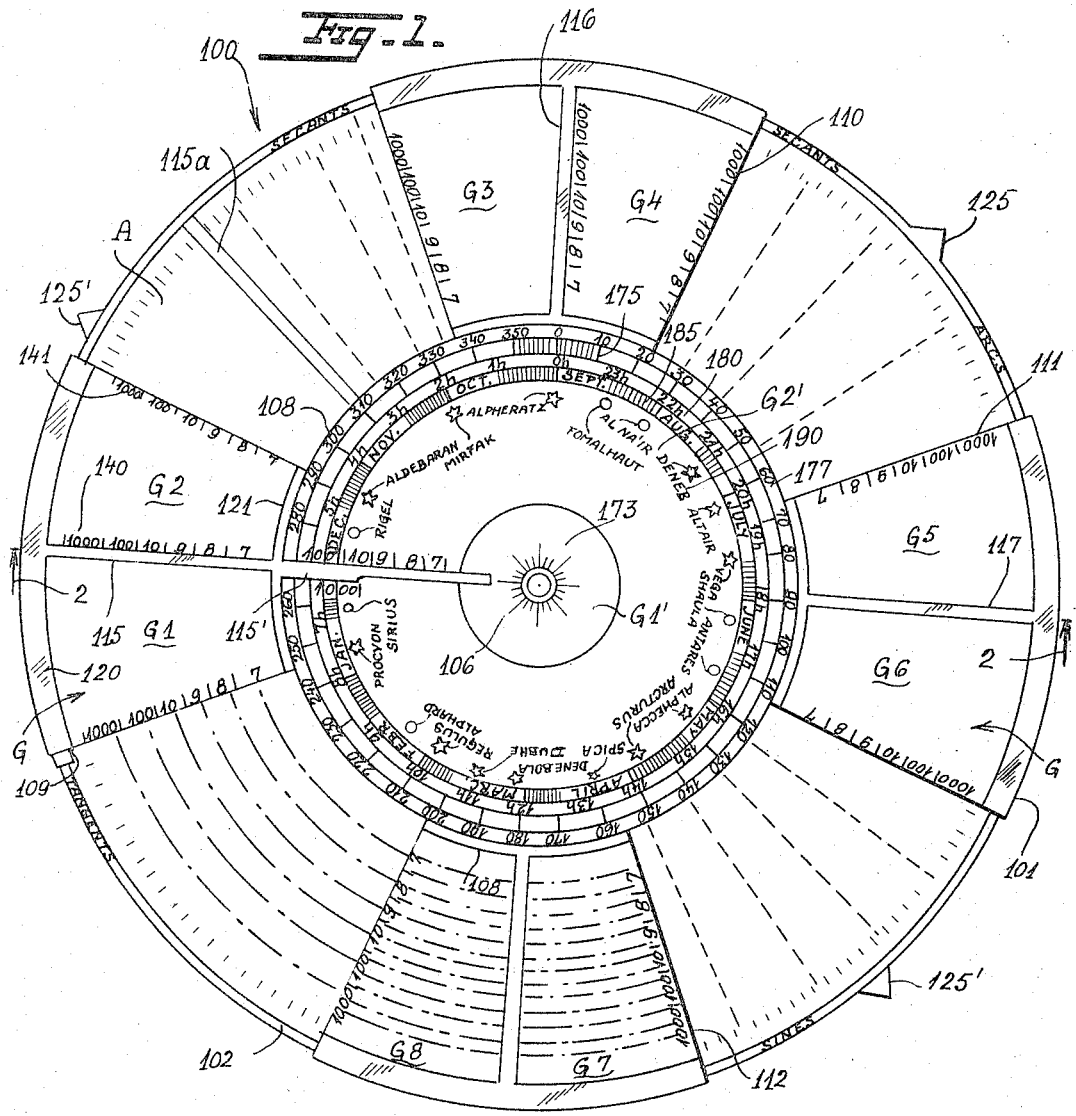
FIGURE 1 is a top plan view showing one side of a computer device embodying the invention.
Figure 2:
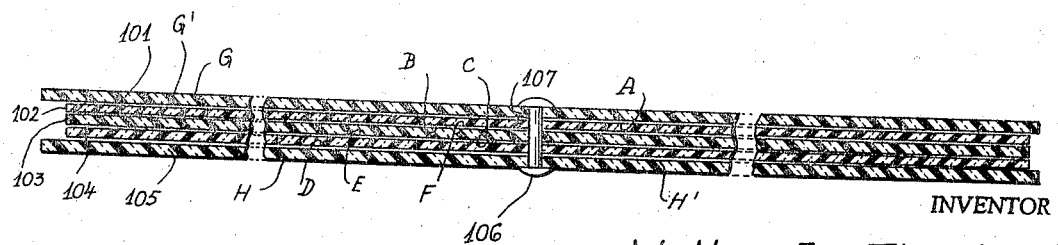
FIG. 2 is an enlarged cross sectional view taken on line 2—2 of FIG. 1, parts being broken away.

Referring first to FIGS. 1, 2 and 3, there is shown a computer 100 comprising a laminated assembly of five thin disks 101–105. The laminated assembly is about eight inches in diameter and about 1/16 of an inch in thickness. The disks are made of stiff transparent plastic material such as a polyester, polyethylene, acrylic or the like, which is about 0.01 of an inch in thickness. The disks are rotatably joined at their centers by a rivet or eyelet 106 extending through registering central holes 107 in the disks.

Outer disk 101 of the assembly as best shown in FIGS. 1, 2, 4 and 5 has a central circular section 108 divided into an inner circular segment G1' and annular segment G2′. Four sectors 109–112 extend radially outward of the central section 108. The sectors each extend and are spaced apart 45° circumferentially of the disk. The outer side G of disk 101 is overprinted with mathematical and computational data described below. The data appear in eight equal large segments G1–G8 of sectors 109–112 and in the two segments G1′, G2′ of central section 108; see FIG. 1. There are two adjacent segments in each of the sectors 109–112. Each of the smaller and larger segments extend about 22½° angularly and arcuately of the disk 101. A long narrow transparent window 115 extends radially of disk 101 from inner circular segment G1′ to a point near the outer edge of sector 109 dividing the sector into the two equal segments G1, G2. Window 115 has a short wider section 115′ extending inwardly of segment G2′. Three other long narrow transport windows 116–118 extend radially of the disk. They bisect the other sectors 110–112 respectively. The windows 115–118 terminate at their outer ends at arcuate, peripheral windows 120 located at the outer circumferential peripheries of the sectors 109–112. They terminate at their inner ends at narrow arcuate windows 121 located at the narrow ends of the sectors where the sectors join central section 108. The inner or reverse side G′ of the disk 101 has no data imprinted or inscribed thereon. Inner windows 121 are narrower than outer windows 120.

The other outer disk 105 of the assembly as best shown in FIGS. 2, 3, 4 and 6, is constructed like disk 101 with eight 45° sectors 109′–112′ radiating outwardly of central circular section 108th. Radial window 115 extends from inner circular segment H1′, across annular section segment H2′ to the outer arcuate peripheral window 120th of sector 109′. The window 115h intersects shorter arcuate window 121h at the inner end of sector 109′. Wider window portion 115h′ extends inwardly of window 121h at the periphery of circular section 108h. Shorter radial windows 116′–118′ connect the inner and outer circumferentially extending arcuate windows of the other three sectors 110′–112′. Pin 106 extends through the central hole of disk 105 as shown in FIG. 2. Appropriate data S′ are inscribed in 22½° segments H1–H8 of the sectors on the outer side H of disk 105. Further data are inscribed in segments H1′, H2′. The inner or reverse side H′ of the disk is blank and has no data marked thereon.

Disk 102 which is adjacent to disk 101 is circular in form. A long narrow window 115a extends radially of the disk from its outer edge to a point near center hole 107. A pointed projection 125 extends radially outward of the periphery of the disk at a point 90° of arc from window 115a. The pointed projection can be used as a finger grip for turning the disk on pin 106 with respect to the other disks. The disk 102 can be turned to set window 115a in registration with window 115 of disk 101.

Side A of disk 102 best shown in FIGS. 1, 2 and 7 is divided into four outer arcuate 90° segments A1–A4 on each of which is a different trigonometric table described below. The radial width of the segments is substantially equal to the radial widths of sectors 109–112 of disk 101. Inner circular section 108a of side A is divided into two equal 180° segments A1′, A2′ which terminate at innermost circular segment 116a. Section 108a and segment 116a are substantially equal in diameter to section 108 and segment G1$_2$ of side G on disk 101. Wider portion 115a of window 115a extends inwardly of section 108a.

Side F of disk 102 shown in FIGS. 2, 12 is divided into two outer arcuate 90° segments F1 and F2 substantially equal in radial width to sectors 109–112 of disk 101. Two inner arcuate segments F1′, F2′ are located in inner circular section 108f which is substantially equal in diameter to section 108 of disk 101. The segments F1′, F2′ extend between segments F1, F2 respectively and innermost circular segment 116f which is equal in diameter to circular segment G1′ of disk 101. Transparent window 115a extends radially of the disk as mentioned above and serves as a divider between segments F1, F1′ and F2, F2′. On the several segments are inscribed trigonometric tables described below.

Disks 103 and 104 shown in FIGS. 2, 4 and 8–11 are similar in structure to disk 102. The disks are all circular and equal in diameter with radial projections 125′, 125″ spaced 90° of arc from radial windows 115b, 115c, identical to windows 115, 115a and 115h. Side B of disc 103 has a single outer annular segment B1 and a single inner radial segment B1′. Window 115b terminates at innermost circular segment 116D. Side E of disk 103 has a single outer annular segment E1 and a single inner segment E1′. Side C of disk 104 has two outer arcuate segments C1, C2, and two inner arcuate segments C1′, C2′ located between circular portion 116c and segments C1, C2. Side D of disk 104 abuts outer disk 105 as shown in FIGS. 2, 3, 4. Side D is divided into four outer 90° segments D1–D4 and two inner 180° segments D1′, D2′. Segments D1′, D2′ extend between inner circular segment 116D and outer segments D1–D4.

The radial widths of outer segments of disk sides A, B and C are all equal to the radial width of sectors 109–112. The radial widths of outer segments of disk sides D, E and F are all equal to the radial width of sectors 109′, 112′ of disk 105. The outer diameters of inner segments of all disks are equal to the outer diameter of circular disk sections 108, 108h and inner diameters of the inner segments are equal to the diameter of inner circular segment G1′ of disk 101.

Trigonometric tables are inscribed on all the segments of disks 102–104 and are listed in the following:

TABLE 1

| Segment | Function |
|---|---|
| A1 | Tangents 1° to 89°; cotangents 89° to 1°. |
| A2 | Secants 1° to 89); cosecants 89° to 1°. |
| A3 | Circular arcs 1° to 90°. |
| A4 | Sines 1° to 90°; cosines 89° to 0°. |
| A1′ | Circular arcs 1″ to circular arcs 59″. |
| A2′ | Circular arcs 1′ to circular arcs 60′. |
| B1 | Tangents 84° 01′ to 89°59′; cot 5°59′ to 0°01′. |
| B1′ | Tangents 89)58′01″ to 89°59′59″; cot 0°01′59″ to 0°00′01″. |
| C1 | Sines 1° to sin 3°59′; cos 89° to cos 86°01′. |
| C2 | Tangents 0°01′ to tangents 0°59′; cot 89°59′ to cotangents 89°01′. |
| C1′ | Sines 0°01′ to sines 0°59′; cos 89°59′ to 89°01′. |
| C2′ | Tangent 0°01′ to tan 0°59′; cot 89°59′ to 89°01′. |
| D1 | Tangent 1° to 89°; cotangents 89° to 1°. |
| D2 | Secants 1° to 89); cosecants 89° to 1°. |
| D3 | Circular arcs 1° to 90). |
| D4 | Sines 1° to 90°; cosines 89° to 0°. |
| D1′ | Circular arcs 1″ to 59″. |
| D2′ | Circular arcs 1′ to 60′. |
| E1 | Tangents 84°01′ to 89°59′; cot 5°59′ to 0°01′. |
| E1′ | Tangents 89°59′01″ to 89°59′59″; cotangents 0°01′59″ to 0°01′01″. |
| F1 | Sines 1° to 3°59′; cosines 89° to 86°01′. |
| F2 | Tangents 1°01′ to 3°59′; cotangents 88°59′ to 86°01′. |
| F1′ | Sines 0°01′ to 0°59′; cosines 89°59′ to 89°01′. |
| F2′ | Tangents 0°01′ to 0°59′ to cot 89°59′ to 89°01′. |

FIG. 13 shows portions of trigonometric tables appearing on side A of disk 102, in outer segments A1, A2, general arrangement of these tables is followed in all the other tables in outer segments of sides A–F of circular disks 102–104. In an outer ring 127 at the periphery of the disk appear indicia 128 stating the function of the table. In an adjacent ring 129 appears index marks 130. Adjacent the marks 130 is a degree scale 131 for each function.

Six concentric tracks 133–138 have numerical values 132 of the several functions arranged in radially extending rows. The numerical values of the functions on sides A, B and C of the disks 102–104 are respectively 1000, 100, 10, 9, 8 and 7 times the base values of the functions, reading radially inward of the disks. These multiplier values are indicated by numerical markings 140 and 141 appearing at window 115 and at edges of the sections 109–112 of outer disk 101; see FIG. 1. The numerical values of the functions on sides E, D, and F of disks 102–104 are respectively 1, 2, 3, 4, 5 and 6 times the base values of the functions. These multiplier values are indicated by numerical markings 140' and 141' appearing at window 115h and at edges of the sectors 109'–112' as indicated in FIG. 3.

In an innermost ring 139 appear the indicia for cofunctions 142 listed in Table 1, and adajacent rings of index marks 143 and degree scale 144. Markings 145, 146 indicating every 10° appear in outer and inner rings 127, 139 respectively.

It will be noted that the outer rings 127 and the inner rings 139 of the several outer segments are arranged so that they will underlay the outer and inner windows 120, 121 or 120h, 121h respectively of disks 101, 105. Furthermore the numerical values 132 are arranged so that they will align with and will appear in window 115 or 115h of disks 101, 105. This arrangement makes it possible to turn the inner disks so that all their radial windows 115a–115c register with radial windows 115 and 115h of disks 101 and 105. Then if any inner disk is turned with respect to all others any desired row of numerical values will appear in radial window 115 or 115h. The shorter radial windows 116–118 and 116'–118' serve to facilitate location of the desired numerical values of the several segments.

The inner segments on sides A–F of disks 102–104 are arranged like segments A1', A2' shown in FIG. 14. Each of the inner segments has seven concentric rings 151–157. Outer ring 151 has a marking 160 identifying the function of the numerical values of the tables. Radially aligned with this marking in rings 152–155 are multiplied numerical values 161 of the functions which are respectively 10, 9, 8, 7 times the base values of the functions on sides A, B and C of the disks. The multiplied values of the functions in the same rings on sides D, E and F of the disks are 4, 3, 2, 1. Just under markings 160 and 161 in rings 151, 152 respectively are multiplied numerical values 163, 164 which are 100 times and 1000 times respectively the base value of the functions on sides A, B and C. In the corresponding rings on sides D, E and F appear multiplied numerical values which are 6 and 5 times the base values of the functions. The reason for the widened portions 115' and 115h' of windows 115, 115h will now be apparent since it is required that the two numerical values 163 and 164 appear at window 115 or 115h along with values 161 at each setting of any disk 102–104. Further markings 170, 171 appear in rings 156, 157 of each inner segment. For trigonometric functions having cofunctions, the angle and cofunction designation appear. For circular arcs as shown in FIG. 14 the designation 170 of "CIR. ARC" and the angle 171 appear. The multiplier values for the several base values of the functions and cofunctions appear as designations 173 and 174 at windows 115 and 115h as indicated in FIGS. 1 and 2 respectively. By the arrangement described, any disk can be turned to align any multiplied value of any function or cofunction of any inner segment with window 115 or 115h. Numerical values 161 on other disks will not appear if their radial windows are aligned with window 115 or 115h at which the desired function values appear.

To the extent described there has been provided a computer or calculator device which has trigonometric tables arranged to provide instantly, multiplied values of trigonometric functions and cofunctions, to seven decimal places for angles as small as 1 second (1") of arc.

The innermost circular segment G1' of the outer side G of disk 101 has a rose 173 representing the sun surrounding the hole 107 and pin 106; see FIGS. 1 and 5. The annular segment G2' has an outer circular 360° scale 175 representing true azimuth. This scale is divided into 360 divisions each representing 1°, and 720 half divisions each representing 30 minutes; FIGS. 1, 15. In outermost ring 177 are numerical indicia 178. Each 10° of scale 175 is identified by the indicia 178. Scale 175 in association with indicia 178 represents a sidereal angle scale 179. In an inner ring 180 adjacent to scale 175 is a twenty-four hour sidereal time scale 179 with designations spaced at intervals of 20 minutes. Scale 179 represents a right ascension scale in association with scale 175 which represents sidereal hour angles. Concentric with and inside of scale 175 is a ring 185 in which is a monthly calender 186 of planet Earth, by positioning the planet and star finder on apparent right ascension of Sun for any required day of the year, the exact position of Earth is indicated at opposite end or 180° separation. Numerical indicia 188 represent circular arc distances counterclockwise from Vernal Equinox for radius vector of 100,000,000 statute miles for indicated space longitudes. Radially inwardly of ring 185 and spaced circumferentially around the section G2' is a start chart 190. Stars south of the celestial equator, having a south declination are represented by circles 192. Stars which are north of the celestial equator are represented by star symbols 194.

The annular segment H2' of sides H of disk 105 is shown in FIGS. 3, 6 and 16. This segment has a 360° scale 196 graduated at each thirty minutes and at each 1° with numerical angular values indicated each 10°. This scale represents true azimuth and can be used in solving a wide variety of engineering problems.

Circular segment H1' of side H is shown to best advantage in FIG. 3, 6, and 17. This segment has an outer annular section 200 representing a celestial sphere with sun 202 at highest point in the sky corresponding to 12 o'clock noon as scale 204 in inner circular section 203 which represents the Earth or terrestrial globe. The linear vector hour and longitude scale 204 extends diametrally across section 203. This scale is divided into graduations of 20 minutes each from zero hours to noon. The most important navigational stars 205 appear in section 200, with accompanying correct declinations 206 indicated to the nearest minute of arc.

On sides G and H of disks 101 and 105 in sections G1–G8 and H1–H8 appear numerical examples (not shown) of ways in which the several scales on the several disks 101–105 may be usefully employed. Some of these examples appear below. The reason for applying them directly to the outer sides of the computer is to insure that the user has right at hand all the information required to use the computer effectively and correctly without requiring other reference data and instructions.

In solving some problems involving determination azimuth of a spacecraft in space, or longitude of a planet in space, it is possible to use the computer in association with a radius vector and oblique angle indicator device 300 shown in FIGS. 18–21 to which reference is now made. This device has a straight arm 301 on which is radius vector scale 302. The arm 301 extends radially outward of a circular disk 304. This disk has a peripheral 360° scale 306 divided into four 90° arcuate quadrants. The straight edge 307 of the scale 302 is aligned with the center of the disk. At the center of the disk is a projection 308 having a concavity 309 adapted to receive the head 106' of pin 106 of the computer 100 as shown in FIG. 19. Scale 302 is a linear one graduated from fifty million to one hundred eighty million miles, each graduation representing one million miles. Slidably mounted on arm 301 is a ring 309 having a peripheral circular scale 310. This is a 360° scale divided into four quadrants of 90° each. The ring 309 has a plate 312 extending inwardly of the ring and formed with a narrow channel 314 underneath through which arm 301 passes. Thus the ring 301 slidably abuts the upper side of the arm. Arm 301 terminates in a pointer 315. Another arm 316 terminating in a pointer 319 extends radially outwardly of ring with edge 320 of arm 316 aligned with the edge 307 of arm 301 and with the 0—0 points of scales 306 and 310.

Examples of ways in which the computer 100 alone or in conjunction with the device 300 may be used for solving various problems appear below:

*Dead reckoning terrestrial air navigation example by trigonometrical computer*

For illustration, the point of departure is a carrier at Lat. 0°00′ (Equator) Long. 35°46′ W., the true air speed is 1000 knots, and the true course is 48 degrees. Problem: What is the position of the aircraft after 1 hour of flight?

Refer to sine solutions side A4 of disc 102 FIG. 7 at sine 48 degrees, base 1000 read departure 743.14 knots, at cosine 48 degrees base 1000 on same disc read latitude difference of 669.13 knots which converted into degrees and minutes of latitude equal 11°09′ North of the Equator, omitting fractions of a mile. As is known, the length of a degree of longitude at latitude 11° North is 59.012 knots. Therefore departure 743.14 knots divided by 59.012=12°35′ which subtracted from point of departure 35°46′=23°11′ West of Greenwich. Position of aircraft by dead reckoning is Lat. 11°09′ N. and Long. 23°11′ W.

The known wind direction is from 318 degrees, and known wind velocity is 50 knots, which divided by true air speed of 1000 knots is 0.05 which can be read to the nearest degree at the D4 side of disc 104 FIG. 10 as a sine component 0.05234 sine 3° at base 1, therefore the True Heading of aircraft is 45° (48°—3°=45°). For distance, true air speed of 1000 knots multiplied by cosine 3°=988.63 knots which can be read on the A4 side of disc 102 FIG. 7 at base 1000, and with a ground speed of a 1000 knots, which is larger by 1.37 knots, the tail wind is 1.37 knots.

Inasmuch as the plane or chord distance for departure of 743.14 knots is less than 1 knot, as compared to a similar spherical global distance, this fraction has been deleted, however tabulated data have been provided on the computer on side H5 and H6 of disc 105 of global spherical distances from 500 to 2,900 knots and their equivalent plane or chord distances to make corrections when required.

*Space distance example to Moon*

For illustration, in space the observed apparent angular equatorial diameter of Moon is 1°30′ the linear diameter is 2160 statute miles. Problem: What is the distance from spacecraft to Moon?

Refer to side E1 of center disc 103 FIG. 11 rotate window of disc 104 over cotangent 1°30′ on E1 side of disc 103 FIG. 11 and read values:

Base 2 (2000) read 76.476918 .+3 _____ 76,376.92
Base 1 (100) read 38.188459 .+2 _____ 3,818.84
Base 6 (60) read 229.130754 .+1 _____ 2,291.31
_____
82,487.07

82,487.07 statute miles is the distance from spacecraft to moon when the apparent diameter is 1°30′. Trigonometrical functions used are accurate to 6 decimal places. The 2 symbols .+ and the numeral 3 which is the exponent denote, that the functional value of 76.376918 has been increased to 76,376.92. The fractions of 918 thousandths of a unit are rounded off to 92 hundredths of a unit. The functional values of bases 1 and 6 have similarly been increased. This method of power notation as a suffix with standard type positions the important decimal point to the positive right, or negative left where required. As indicated in line 52 above in preceding example .+3 literally means, the decimal point is advanced to the positive right 3 places, conversely .—3 denotes the decimal point is moved to negative left 3 places. By the use of such exponents multiplication can be done in less time, and may be typed with any standard typewriter because dwarf numerals are not required, but most significant, solutions are accurate.

*Space solar distance example*

For illustration, in space the observed apparent angular equatorial diameter of sun is 0°28′ the linear diameter is 865,000 statute miles. Problem: What is the distance from spacecraft to sun?

Refer to B1 side of disc 103 FIG. 8 and read values at Co. 0°28′ base 8 (800,000) 982.19168
.+5 _____ 98,219,168.00
Cot 0°28′ base 6 (60,000) 736.64376
.+4 _____ 7,366,437.00
Cot 0°28′ base 5 (5000) 613.86980
.+3 _____ 613,869.00
_____
106,199,474.00

Distance from spacecraft to sun is 106,199,475.00 statute miles. Functions used are accurate to 5 decimal places.

*Space distance example to planet Mars*

For illustration, in space the observed apparent angular equatorial diameter of Mars is 1′58″ the linear diameter is 4,220 statute miles. Refer to E1 side of disc 103 FIG. 11 position windows of discs 104 and 105 over 1′58″ on E1′ side of disc 103 and read values as indicated below:

Cot 1′58″ base 4 (4000) 6,992.02656
.+3 _____ 6,992,026.00
Cot 1′58″ base 2 (200) 3,496.013 .+2 ___ 349,601.00
Cot 1′5″ base 2 (20) 3,496.013 .+1 ____ 34,960.00
_____
7,376,587.00

Distance in statute miles to Mars is 7,376,587.00.

*Outer space distance example to star Sirius*

For illustration, in outer space the observed apparent angular equatorial diameter of Sirius is 1″ of arc, the assumed linear diameter is 1,700,000.00 statute miles. Refer to E1′ side of disc 103 FIG. 11 at cotangent 1″ read values:

Cot 1″ base 1 (1,000,000) 206,264.8
.+6 _____ 206,264,800,000.00
Cot 1″ B1′ of disc 103 FIG. 8 base
7 (700,000) read 1,443,853.64
.+5 _____ 144,385,300,000.00
_____
350,650,100,000.00

Due to space limitation on computer, the function of cot 1″ is accurate to 1 decimal place only, and the solution is approximate only and short 70,617.3 statute miles of the correct distance of 350,650,170,617.3 statute miles when function accurate to 7 decimal places is used.

For assumed linear diameter of 1,700,007.00 statute miles and using function accurate to 7 decimal places, the distance from spacecraft to star Sirius in outer space is 350,651,614,470.9 statute miles when observed apparent diameter of Sirius is 1″ of arc.

*Engineering solution for direct reading of inclination of retaining wall from the vertical*

For illustration, the angle of elevation for a 1000 foot high retaining wall is 88 degrees. Refer to A1 side of disc 102 FIG. 7 at cotangent 88° base 1000 read solution directly on computer 34.92 feet inclination from the vertical at top of the retaining wall.

*Engineering solution for direct reading of length of inclined side of retaining wall*

Refer to A2 side of disc 102 FIG. 7 at cosecant 88° at base 1000 read 1,000.61 feet directly on computer which is the length of inclined side of retaining wall 1000 feet in height.

Circular arc engineering example and solution

For illustration, the radius of a section of a circularly formed wall is 900 feet, the angular distance is 30°45′55″ refer to A3 side of disc 102 FIG. 7 and read:

```
Cir. arc 30°  base 9 (900)  4.7123892 .+2 ___  471.23892
Cir. arc 45′ base 9 (900)  0.1178100 .+2 ___   11.78100
Cir. arc 55″ base 9 (900)  0.0023994 .+2 ___    0.23994
                                              ─────────
                                               483.25986
```

Circular arc distance is 483.25986 feet.

Read directly solutions in terrestrial range finding

For illustration, range finder used in 10 yards in length. The angular separation to apex and target is 1′24″ of arc. Refer to B1′ side of disc 103 FIG. 8 at cot 1′24″ base 10 read range directly 24,555.333 yards.

Read directly solutions in space range finding

For illustration, in space an unknown spacecraft is observed. The range finder used is 2 meters in length, and the angle of separation to target is 1″ of arc. Refer to E1′ side of disc 103 FIG. 11. At cot 1″ base 2 read range directly of 412,529.6 meters on computer which converted are 412 kilometers, 529 meters and 60 centimeters.

To facilitate quick and accurate readings of computer solutions, please refer to included details of sine and cosine solutions of included details of side A4 of disc 102, FIG. 7, which are representative of all examples.

In the dead reckoning terrestrial air navigation example by trigonometrical computer, the true course of aircraft is 48′ and the flight distance 1000 knots. At sine 48′ base 1000 read departure of 743.14 knots directly, and at cosine 48′ base 1000 read latitude difference of 669.13 knots also directly on the computer. Both solutions are underscored for rapid recognition. No mathematical calculations are required, which provides increased safety for the pilot and his aircraft. Similar advantages in other computer applications and solutions are obtained by this computer, in saving of time and in dependable accuracy.

Planet and star finder mounted on computer and is positioned heliocentric on star Sirius, as observed from spacecraft Jan. 1, 1970 at opposite end or 180 degrees separation read sidereal hour angle or space longitude to within minutes of arc. For space longitude accurate to fractions of seconds of arc, read start data on scales G5, G6 Sirius 6ʰ43ᵐ33.7ˢ EPOCH 1964 precession for 6 years at 2.64 seconds of time each year=15.84 seconds plus 12 hours=18ʰ43ᵐ49.54ˢ converted to arc=280°57′23″.10 therefore 360°−280°57′23″.10=S.H.A. 79°02′36″.9 and is position of spacecraft Jan. 1, 1970 when heliocentric with star Sirius in space. Any of the larger stars, and when heliocentric can be used to orient every spacecraft in space by means of this computer 10, 20 or more years from EPOCH 1964 with accuracy to within 1 second of arc.

Preceding examples of solved problems are only a few of a multitude the computer can solve, including multiple solutions simultaneously.

With the use of the exponential notation, applied in preceding examples, triangles and circular arcs with baselines or radii to near infinity can accurately and rapidly be solved, also in space range finding to distances of millions of miles and/or kilometers involving angular separations of fractions of 1 second of arc. Any unit of length can be used.

Conversely this computer provides accurate solutions of fractions to the millionth part of a unit or smaller by direct reading of solutions, or by two or three simple additions.

While I have illustrated and described the preferred embodiments of my invention it is to be understood that I do not limit myself to the precise constructions herein disclosed and that various changes and modifications may be made within the scope of the invention as defined in the appended claims.

What is claimed is:

1. A computer device of the character described, comprising a plurality of circular disks, pivot means rotatably securing the disks together to constitute a laminated assembly, each of said disk having a radially extending window free of any indicia thereon, the radial windows in the several disks being disposable in registration with each other by rotation of the disks with respect to each other, the two outermost disks on opposite sides of said assembly each having indicia thereon spaced radially of the disk and located adjacent the radial window thereof, each of the inner disks between the outermost disks having tables of trigonometric functions thereon, said tables being arranged in a plurality of concentric tracks, with numbers in each track extending radially of the inner disk and aligned with numbers in each of the other tracks radially of the inner disk, said tracks being aligned with the respective indicia on the outermost disks, whereby a radial line of numbers on any inner disk can be read through registering radial windows of all other overlaying disks, the outermost disks each have a central circular section and a plurality of sectors extending radially outwardly of the central circular section, said sectors being spaced apart circumferentially of the outermost disks exposing adjacent inner disks to facilitate rotation of said inner disks, said inner disks each having a peripheral projection extending radially outwardly and located the same angular distance from the radial window on each of the inner disks to facilitate aligning the radial windows of the inner disks with the radial windows of the outermost disks, said radially outwardly extending sectors having additional indicia for use in increasing and decreasing values exponentially.

2. A computer device as recited in claim 1, wherein each of the disks has a peripheral circumferentially extending window, the peripheral windows of the inner disks having other indicia thereon identifying the trigonometric functions tabulated on the respective inner disks, said other indicia being readable through the registering peripheral windows of all other overlaying disks.

3. A computer device as recited in claim 2, further comprising circularly curved arcuate windows formed in the outermost disks and spaced radially from the peripheries thereof, said inner disks having annular windows concentric with and spaced radially inwardly of the peripheries thereof and registering with the arcuate windows in the outermost disks, said annular windows having still other indicia thereon identifying trigonometric cofunctions tabulated on the respective inner disks, the last named indicia being readable through the registering arcuate and annular windows of all other overlaying disks.

4. A computer device as recited in claim 1, wherein the disks are each made of thin, plastic material, said assembly having an overall thickness on the order of one sixteenth of an inch.

5. A computer device as recited in claim 1, wherein each of the inner disks has a peripheral circumferentially extending window, each of the outermost disks having peripheral windows at outer ends of the sectors, the peripheral windows of the inner disks having other indicia thereon identifying the trigonometric functions tabulated on the respective inner disks, said other indicia on any disk being readable through the registering peripheral windows of all the other overlaying disks.

6. A computer device as recited in claim 5, further comprising circularly curved arcuate windows formed in the outermost disks at inner ends of said sectors adjacent the periphery of said circular section, said inner disk having annular windows concentric with and spaced radially inwardly of the peripheries thereof and registering with the arcuate windows in the outermost disks, said annular window having still other indicia thereon identifying trigonometric cofunctions tabulated on the respective inner disks, the last named indicia on any one inner disk being readable through the registering arcuate and annular windows of all the other overlaying disks.

7. A computer device as recited in claim 1, wherein the central section of one of the outermost disks has a plurality of concentric circular scales thereon constituting respectively a three hundred sixty degree azimuth scale, a scale of right ascensions, a twenty-four hour sidereal time scale, and a twelve months' calendar of monthly relative positions of planet Earth; a star chart comprising representations of principal stars spaced apart circumferentially around said central section inwardly of said circular scales; and a representation of the sun at the center of said one outermost disk, whereby the relative position of the Earth, sun, and of any body in space can be determined with respect to any of said stars at any time during the calendar year, from a reading of the scales.

8. A computer device as recited in claim 1, wherein the central section of the other one of the outermost disks has a three hundred sixty degree true azimuth scale at the periphery thereof, a linear vector hour and longitude scale extending diametrally across the center of the disk, and a chart denoting sun and stars disposed circumferentially around the center of the disk and located in predetermined positions for determining local time, latitude and longitude of an observer of the right ascension and zenith of the sun and any one of the stars.

References Cited

UNITED STATES PATENTS

| | | | |
|---|---|---|---|
| 1,453,100 | 4/1923 | Fulgora | 235—88 |
| 2,039,921 | 5/1936 | Murphy | 235—88 |
| 2,437,621 | 3/1948 | Strate | 235—78 |
| 2,965,980 | 12/1960 | Day | 235—88 |
| 2,967,016 | 1/1961 | Gray | 235—78 |
| 3,003,258 | 10/1961 | Stefano | 235—78 |
| 3,082,948 | 3/1963 | Simini | 235—78 |
| 3,108,746 | 10/1963 | Chrisler | 235—78 |
| 3,109,588 | 11/1963 | Polhemus et al. | 235—88 |

RICHARD B. WILKINSON, *Primary Examiner.*

S. A. WAL, *Assistant Examiner.*